(12) United States Patent  
Ubik et al.

(10) Patent No.: US 7,917,260 B2
(45) Date of Patent: Mar. 29, 2011

(54) APPARATUS AND METHOD FOR REMOTELY TESTING MULTIPLE COMMUNICATION CHANNEL INPUTS TO A VEHICLE COMPUTER

(75) Inventors: Henry Thomas Ubik, Grosse Pointe Park, MI (US); James Smarr Collins, New Boston, MI (US); Gary M Denomme, Grafton, OH (US)

(73) Assignee: Ford Motor Company, Dearborn, MI (US)

( * ) Notice: Subject to any disclaimer, the term of this patent is extended or adjusted under 35 U.S.C. 154(b) by 494 days.

(21) Appl. No.: 12/126,624

(22) Filed: May 23, 2008

(65) Prior Publication Data

US 2009/0292416 A1  Nov. 26, 2009

(51) Int. Cl.
*G01M 17/00*  (2006.01)
*G06F 19/00*  (2006.01)
(52) U.S. Cl. .............................. 701/33; 701/29; 455/41.2
(58) Field of Classification Search .................... 701/33, 701/29, 35, 136; 455/41.2, 425, 466
See application file for complete search history.

(56) References Cited

U.S. PATENT DOCUMENTS

| 6,553,292 | B2* | 4/2003 | Kokes et al. .................... 701/33 |
| 6,598,183 | B1 | 7/2003 | Grieco et al. |
| 6,603,394 | B2 | 8/2003 | Raichle et al. |
| 6,778,888 | B2 | 8/2004 | Cataldo et al. |
| 7,146,307 | B2 | 12/2006 | Mocek |
| 7,155,321 | B2 | 12/2006 | Bromley et al. |
| 7,340,365 | B2 | 3/2008 | Wubbena et al. |
| 7,343,526 | B2 | 3/2008 | Aditham |
| 7,590,476 | B2 | 9/2009 | Shumate |
| 2003/0036832 | A1* | 2/2003 | Kokes et al. .................... 701/33 |
| 2004/0054503 | A1 | 3/2004 | Namaky |
| 2006/0034231 | A1* | 2/2006 | Tailor ............................ 370/338 |
| 2006/0229777 | A1 | 10/2006 | Hudson et al. |
| 2006/0253235 | A1 | 11/2006 | Bi et al. |
| 2007/0162796 | A1 | 7/2007 | Chan et al. |
| 2009/0177352 | A1 | 7/2009 | Grau et al. |
| 2009/0308134 | A1* | 12/2009 | Pepper ........................... 73/1.06 |

OTHER PUBLICATIONS

Kermit Whitfield, "A hitchhiker's guide to the telematics ecosystem", Automotive Design & Production, Oct. 2003, http://findarticles.com, pp. 1-3.

* cited by examiner

*Primary Examiner* — Tan Q Nguyen
(74) *Attorney, Agent, or Firm* — Jennifer Stec; Brooks Kushman P.C.

(57) ABSTRACT

An embodiment of the present invention includes an apparatus for remotely testing a plurality of communication channel inputs to an automobile computer. The apparatus may include a microprocessor electrically connected to a persistent memory. The memory may have stored therein communication channel test messages corresponding to each of two or more communication channel inputs to an automobile computer. At least one of the communication channels is a wireless communication channel. The microprocessor may be configured to output a test message over a selected communication channel to the automobile computer.

20 Claims, 7 Drawing Sheets

APPARATUS AND METHOD FOR
REMOTELY TESTING MULTIPLE
COMMUNICATION CHANNEL INPUTS TO A
VEHICLE COMPUTER

BACKGROUND OF THE INVENTION

1. Field of the Invention

Embodiments of the present invention relate to an apparatus and method for remotely testing multiple communication channel inputs to a vehicle computer.

2. Background Art

U.S. Pat. No. 4,694,408 (directed to an apparatus for testing auto electronics systems) and U.S. Pat. No. 4,831,560 (directed to a method for testing auto electronics systems) disclose an interactive system and method for testing vehicle electronics systems in which various vehicle subsystems are exercised under the control of a tester unit while the performance of associated subsystems are monitored to detect and isolate malfunctions. The tester includes interchangeable program cartridges that can be easily inserted to adapt the unit for a variety of different vehicles and test procedures, and also optional interchangeable input/output cartridges for test procedures in which additional access to or from the tester or peripheral devices is necessary. The test unit accesses the vehicle's electronics data bus by means of an assembly line diagnostic link, the access being accomplished via a multiplexer that makes it possible to locate faults on the data bus itself. The tester greatly reduces the time and effort necessary to analyze malfunctions in the field, and is considerably more comprehensive than prior test equipment.

U.S. Pat. No. 5,541,840 directed to a handheld automotive diagnostic service tool discloses a system and method for diagnosing and isolating problems and for monitoring operating conditions on an automobile. The system includes a hand held unit and a master station which can operate alone or in unison to accomplish functions such as logging and displaying data on a real-time basis, logging data remotely and displaying the data at a later time, diagnosing fault conditions, monitoring operating parameters, reprogramming on-board vehicle controllers, displaying service manual and service bulletin pages and ordering parts on-line.

U.S. Pat. No. 6,603,394 B2 directed to a multi-protocol wireless communication module discloses a wireless communication module that communicates with a remote station and a plurality of motor vehicle control units that implement at least two different communication protocols within a single motor vehicle. The wireless communication module includes an RF interface, a processor and a selectable multiple protocol interface. The processor communicates with the RF interface and thereby communicates with the remote station. The processor executes diagnostic routines and thereby provides commands to one of the plurality of motor vehicle control units. The selectable multiple protocol interface is coupled between the plurality of motor vehicle control units and the processor. The selectable multiple protocol interface converts processor commands into a format that is readable by the selected motor vehicle control unit and converts received diagnostic information into a format that is readable by the processor. If desired, both the selectable multiple protocol interface and the processor functionality can be incorporated within the field programmable gate array.

SUMMARY OF THE INVENTION

An embodiment of the present invention includes an apparatus for remotely testing a plurality of communication channel inputs to an automobile computer. The apparatus may include a microprocessor electrically connected to a persistent memory. The memory may have stored therein communication channel test messages corresponding to each of two or more communication channel inputs to an automobile computer. At least one of the communication channels is a wireless communication channel. The microprocessor may be configured to output a test message over a selected communication channel to the automobile computer.

An embodiment may include a wireless transceiver in communication with the microprocessor for wirelessly communicating at least one of the test messages to a wireless communication input to the automobile computer.

An embodiment may include one or more switches connected to the microprocessor which, upon operation, cause the microprocessor to pair the wireless transceiver with the wireless communication input to the automobile computer, select one of the two or more communication channel inputs and corresponding test messages for testing, and output the corresponding test message over the selected communication channel input.

The wireless communication channel may be a BLUETOOTH communication channel. The apparatus may include one or more output indicators to identify which of the two or more communication channels has been selected for testing. The output indicator may be a light emitting diode.

The communication channel test messages may be stored in two or more different languages, and operation of the switch(es) may cause the microprocessor to select the language of the test message for output over the selected communication channel.

The two or more communication channels may include a universal serial bus. A voltage differential on the universal serial bus may provide power to the microprocessor.

The persistent memory may be flash memory.

The apparatus may include a digital-to-analog converter for converting digitally-encoded test messages into analog audio signals.

An embodiment of the present invention includes a method for remotely testing the operability of two or more communication channel inputs to a vehicle computer. At a test tool remote from the vehicle computer, the method may include receiving input selecting one of two or more communication channel inputs to the vehicle computer, at least one of which is a wireless communication channel, pairing a wireless transceiver in the test tool with a wireless transceiver electrically connected to the vehicle computer, and outputting over the selected communication channel a test message unique to that communication channel.

At a vehicle computer, the method may include receiving input selecting one of one of two or more communication channel inputs to the vehicle computer, (2) receiving input for pairing a wireless transceiver in communication with the vehicle computer with a wireless transceiver in the test tool, and (3) if the test message is received at the vehicle computer over the selected communication channel, outputting the message for playback over the vehicle audio system.

The method may also include illuminating at the test tool an indicator identifying which communication channel has been selected for testing.

The method may include selecting a test message language from two or more languages at the test tool, and outputting the test message over the selected communication channel in the selected language. An indicator may be illuminated at the test tool identifying which test message language has been selected.

The method may include receiving at the test tool input defining a multiple digit PIN number for pairing the wireless transceiver with the wireless transceiver electrically connected to the vehicle computer.

The method may include establishing a universal serial bus or analog communication connection between the test tool and the vehicle computer.

The method may include converting a test message in a digital format to an analog format at the test tool for communication to a vehicle entertainment system over an analog communication channel.

These and other aspects of the present invention will be better understood in view of the attached drawings and following detailed description of the invention.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings, of which:

DETAILED DESCRIPTION OF THE PREFERRED EMBODIMENT(S)

Figure 1:
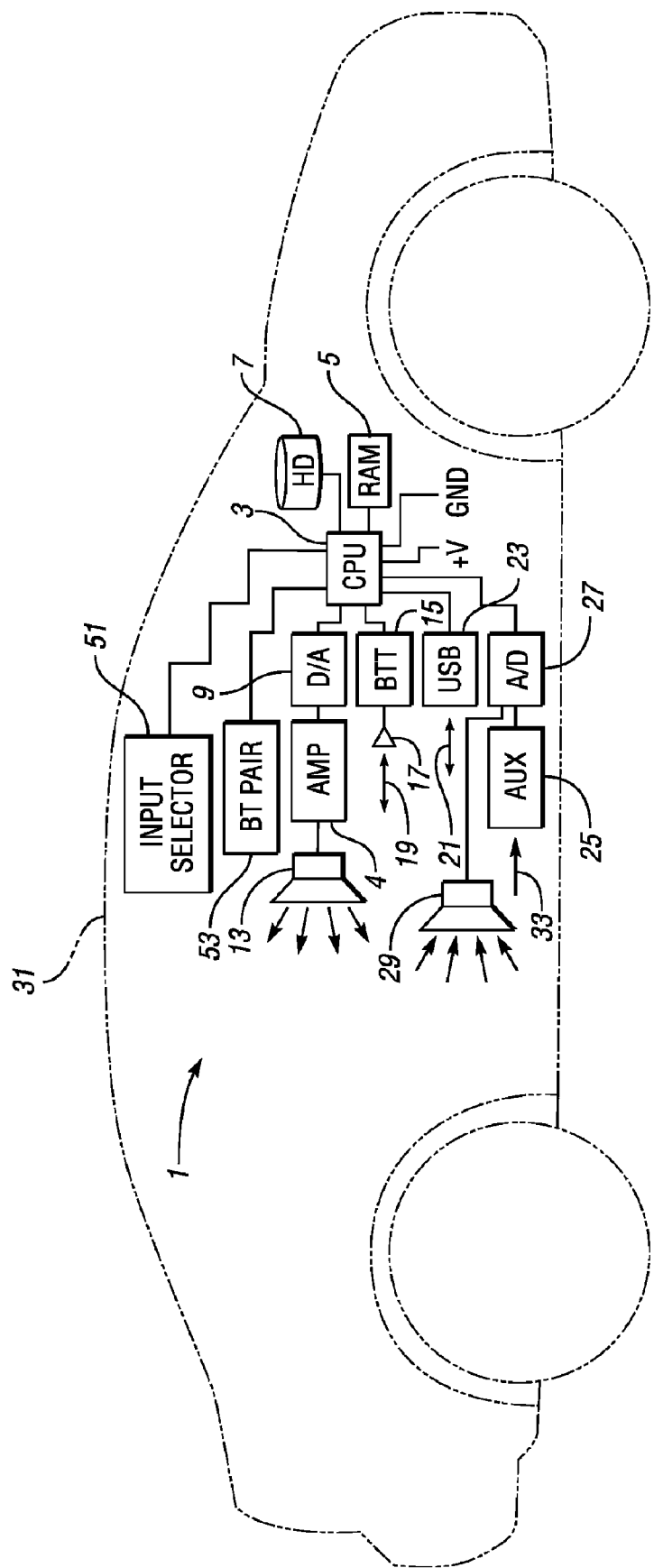
FIG. 1 is an exemplary block topology for a vehicle computing and communication system.

FIG. 1 illustrates an example block topology for a computing and communication system 1 (CCS) for a vehicle 31. Central processing unit (CPU) 3 may include a digital data processor or microprocessor, and is powered with positive direct current voltage +V (e.g. 5 volts DC). The CPU may be in operable communication with volatile or random access memory (RAM) 5. CPU 3 may also have access to database or hard drive 7 for persistent information storage and retrieval. Alternatively or in addition, CPU 3 may interface with flash memory, such as a flash drive or smart card (not shown). CPU 3 may have a digital output to digital-to-analog converter 9 for converting digital signals into analog signals such as audio or video signals. Those signals may be amplified for playback at speaker(s) 13 or a video display (not shown), as is well known in the art. Alternatively, a digital signal processor may process digital signals for playback at speaker(s) 13 or a visual display (not shown). Computing and communication system 1 may or may not include a global positioning (i.e., navigation) system (GPS) configured for location determination, navigation services, or both.

CPU 3 may have a plurality of input channels. For example, microphone 29 may detect voice and convert that voice to an analog electrical signal. The analog signal may be converted to a digital signal at analog-to-digital converter 27 for input to CPU 3. Analog signals 33 may also be received at auxiliary input 25, converted to digital signals at converter 27, and input to CPU 3.

CPU 3 may communicate bidirectionally with remote devices via BLUETOOTH transceiver 15 having antenna 17 for communicating radio frequency (RF) signals 19 according to the BLUETOOTH communication specifications and protocol. BLUETOOTH RF communication may be established between CPU 3 and a plurality of remote computing devices including but not limited to cellular telephones, personal media devices, health monitoring devices, laptop or minicomputers, vehicle modules, personal navigation devices and the like.

CPU 3 may also communicate bidirectionally with remote computing devices via universal serial bus (USB) 23. An input selector 51 may be operated by a vehicle occupant to select among the several available inputs to CPU 3. For the BLUETOOTH communication channel, a BLUETOOTH pairing mode may be entered by selecting pairing button 53.

Figure 2:
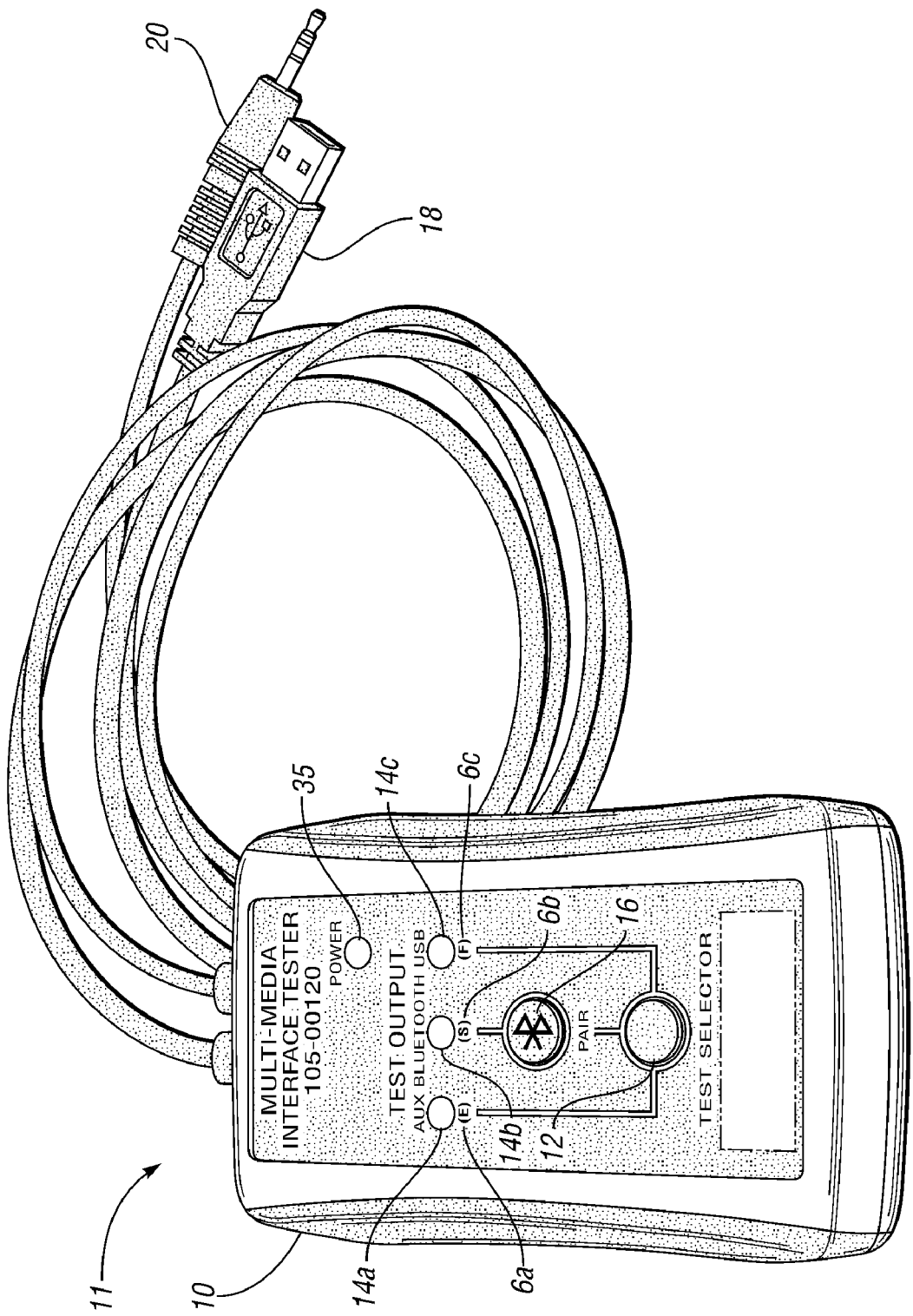
FIG. 2 is exemplary embodiment of a test tool for testing a plurality of communication channels at a vehicle computer.

FIG. 2 illustrates one example of a tool 11 for testing one or more of a plurality of communication channels to and from CPU 3. Tool 11 may include a housing 10 having a plurality of output indicators, e.g., auxiliary 14a, BLUETOOTH 14b, USB 14c and power 35. In another embodiment, there may be indicators for a plurality of other communication channels. Non-limiting examples include Worldwide Interoperability for Microwave Access (WiMax), Wi-Fi, ZigBee, and wireless USB. The test tool 11 may also test any combination of these plurality of communication channels. Output indicators may include light emitting diodes (LEDs), a liquid crystal display (LCD), or other form of visual output. An indicator may also be provided (not shown) indicating that the tool 11 is or has been paired with another BLUETOOTH device. Tool 11 may also include input buttons or selectors 12 (test selector) and 16 (BLUETOOTH pairing mode). Tool 11 may also include auxiliary output 20, and USB connection 18 (e.g. High Speed USB 2.0). As explained in greater detail below, tool 11 internally includes a BLUETOOTH transceiver in compliance with the Advanced Audio Distribution Profile (A2DP), specification. Alternatively, the tool 11 may include a BLUETOOTH transceiver compatible with the Hands Free Profile (HFP) or Headset Profile (HSP) specifications or a combination of the various profiles. In one embodiment, the USB interface 18 may provide a voltage differential to testing tool 11. In another embodiment, the test tool 11 may allow for testing a video output from the CPU 3. The test tool 11 may test, for example, the audio portion of an MP4. There may be an indicator at the test tool 11 for indicating the testing of the video signal.

LEDs may indicate which communication channel 14a, 14b, 14c is being tested, as described below. A user may operate test selector button 12 to initiate testing of each of the communication channels. A user may operate BLUETOOTH pairing button 16 to pair the BLUETOOTH transceiver located within tool 11 to the BLUETOOTH transceiver 15 located within the vehicle 31.

A user may operate one or more switches or buttons to select a language for testing one or more of the communication channels. LEDs may also indicate in which language the multiple communication channels are being tested. For example, the LED may indicate that a communication channel 14a, 14b, 14c is being tested in English (E) 6a, Spanish (S) 6b, or French (F) 6c. The communication channels may be tested in other languages. Operation of the language selection functionality of the test tool 11 will be further described below.

Those of skill in the art will appreciate that the external configuration of tool 11 is not limited to the particular configuration illustrated in FIG. 2 and described above. A multitude of different shapes and configurations may be implemented. For example, the test tool may be implemented in software running on a portable computing device, such as a laptop computer, handheld computer or other mobile computing device. The shape and physical configuration of the tool illustrated in FIG. 2 shall not be a limitation of the present invention.

Figure 3:
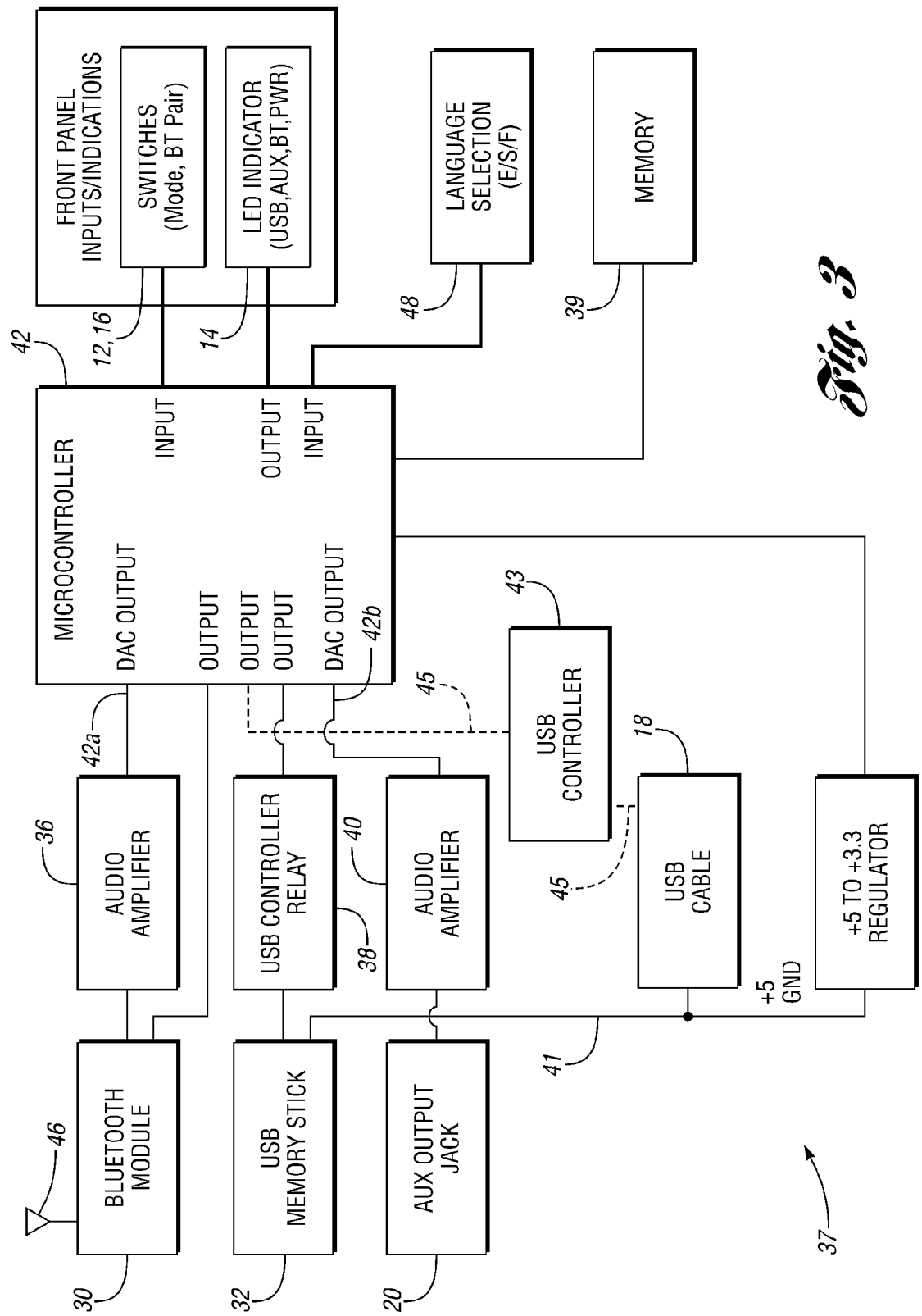
FIG. 3 is an exemplary embodiment of the circuitry implemented in the multimedia testing tool.

FIG. 3 illustrates a block diagram for example circuitry 37 that may be implemented within tool 11. Those of skill in the art will appreciate that the particular circuitry utilized to implement embodiments of the present invention is not limited to the particular circuit configuration illustrated in FIG. 3. For example, the circuitry illustrated in FIG. 3 tests externally originating inputs to CPU 3 inside vehicle 31. The circuitry of FIG. 3 could be readily configured to test the outputs from CPU 3 communicated through BLUETOOTH transceiver 15 or USB port 23.

Example circuitry 37 includes a microcontroller 42. In one embodiment, microcontroller 42 may include a MOTOROLA 8051 8-bit processor (e.g., SILICON LABS C8051F352), a system clock, and memory (e.g. flash, SRAM, XRAM, etc.). Microcontroller 42 may be powered by USB interface 18. Alternatively, the tool 11 may be powered by internal battery power, solar power, or by one of the vehicle's 12 volt auxiliary power ports (not shown). If a 12 volt DC power supply is used, a voltage regulator may be necessary to supply the microcontroller and other devices with 5 volts DC.

In communication with the microprocessor 42 may be a BLUETOOTH transceiver 30 having an antenna 46. The transceiver 30 may be an established Advanced Audio Distribution Profile (A2DP) compatible device for streaming of audio between BLUETOOTH devices. The test tool 11 may also be a HFP or HSP compatible device as described above. The transceiver 30 may pair with the vehicle's BLUETOOTH transceiver 15 when testing the BLUETOOTH communication channel. Transceiver control may be accomplished through software encoded on the microcontroller 42. The transceiver 30 may also be in communication with an audio amplifier 36 for outputting an audio test file stored in persistent memory 39. The transceiver 30 may be an FCC approved component of the testing device. In one embodiment, the transceiver 30 may pair the testing device 11, upon pressing the BLUETOOTH pairing button 16, with the vehicle's BLUETOOTH transceiver 15 during BLUETOOTH connectivity testing. Further details of the operation of the BLUETOOTH testing will be further described below. The pairing may be accomplished through a manufacturer developed automated sequence to allow for successful pairing between the devices, embodiments of which are described below.

A USB flashdrive or memory stick 32 may be housed within the testing device. The USB flashdrive 32 may be used for testing the connectivity of the USB communication channel via connection 41 upon operation of USB controller relay 38. When the USB test selector 14c is depressed, an output signal from microprocessor 42 is generated to activate the USB controller relay 38. In one embodiment, the controller relay 38 controls the power of the USB flashdrive 32. For example, the controller relay 38 may keep the power of the flashdrive 32 shut off until testing of the USB communication channel is selected. Alternatively, audio test files stored in persistent storage 39 may be output to USB interface 41 during testing. In one embodiment, test audio files are stored in the flashdrive 32 (and/or memory 39) as meta files and stored in multiple languages such as English, French, and Spanish. The testing device may or may not provide a language selection capability 48 for the USB connection. In one embodiment the output of the USB connectivity test may include sequential test messages in each language without any selection or change by the user (e.g., service technician) through the language selector 48.

In an alternative embodiment, language selection can occur at microcontroller 42 through the language selector switch 48 when test messages of different languages are separately addressed within persistent memory 39. In this embodiment, test signals are output to USB controller 43 and communicated to USB cable 18 via interface 45.

Microprocessor 42 may also include a digital-to-analog converter (DAC) 42b for testing the auxiliary output 20. In one embodiment, the DAC 42b is embedded on the microprocessor 42 and works in communication with the microprocessor's 42 memory 39 to output analog audio files when testing the auxiliary connection.

Microprocessor 42 may also include memory 39 for audio file storage. The audio files stored in the microprocessor 42 memory 39 may be the output that is transmitted when the BLUETOOTH and auxiliary communication channels are tested. The USB flashdrive 32 within the testing device may contain separate memory which stores the audio files used for USB connectivity testing. In one embodiment, the microprocessor 42 stores in persistent memory 39 the audio files for the BLUETOOTH, USB, and auxiliary communication channels, serves as the operation center for the testing device, and contains the circuitry for controlling the testing of all three communication channels. This operation is described in greater detail below.

The microprocessor memory 39 may separately address storage of the audio files in several different languages such as English, French and Spanish. Through the language selector switch 48 in communication with the microprocessor 42, the memory address for one of these three languages may be selected for playback during testing. In one embodiment, the language selector switch allows language selection for BLUETOOTH, USB and auxiliary channels which are all in communication with the microprocessor 42. The microprocessor 42 may also contain instructions and circuitry to allow for test switching capabilities between the three communication channels through a test selector button 12 located at the testing device 11 in communication with the microprocessor 42. The operation of the test selector button 12 will be further described below.

Figure 4:
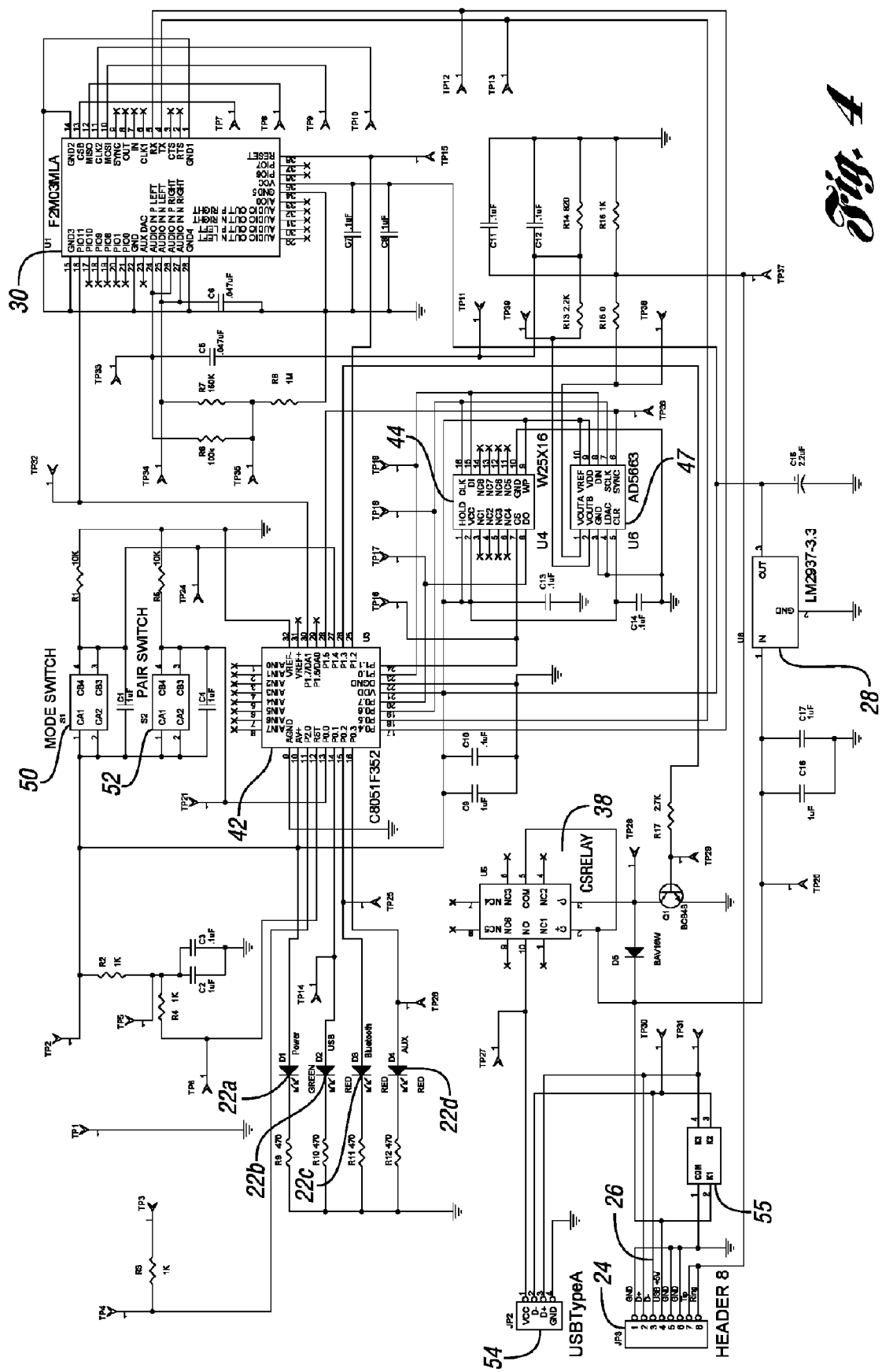
FIG. 4 is one embodiment of the PC board layout implemented within the multimedia testing tool.

FIG. 4 illustrates an exemplary schematic of the testing tool's 11 PC board layout (PCB). Connector 24 may interface with auxiliary cable interface 20 and USB interface cable 18. USB connector 24 may include USB power connection (+5v DC) 26 that is regulated by a voltage regulator 28. In one embodiment, connector 24 is an 8-pin connector.

Connector 24 may be in electrical communication with a surge protector 55 (such as part number SP0505BAHTG manufactured by LITTELFUSE). Interface 54 may connect to the flash/memory stick 32 (FIG. 3) and transmit audio or video files when in USB mode. Interface 54 may be in electrical communication with a USB controller relay 38 which controls the power to the flash drive (e.g. leaves power off) until the USB channel is tested. Relay 38 is activated by pin 26 of microprocessor 42.

A mode select switch 50 may transmit an electrical signal when toggling between test modes (e.g., USB, AUX, BLUETOOTH) during protocol testing. A BLUETOOTH pairing switch 52 may transmit an electrical signal for pairing the test tool 11 BLUETOOTH transceiver 30 to the vehicle BLUETOOTH transceiver 15 in order to enable testing of the BLUETOOTH communication channel. The pairing process will be described in further detail below. During protocol testing, instructions may be sent to microcontroller 42 to light LEDs 22a (power), 22b (USB), 22c (BLUETOOTH) and 22d (AUX). For example, when the test tool 11 is powered through USB connection 18, the LED for power 22a may light green. During testing of any protocols, the LEDs 22b, 22c, 22d may light red.

A flash memory chip 44 may store audio files for use during testing. One example of a flash memory chip is part number W25X16VSFIG manufactured by WINDBAND. The use of audio files will be further described in detail below. The flash memory chip 44 may also serve as external persistent memory to the microcontroller 42.

A Digital-to-Analog Converter (DAC) 47 may be used during testing to convert media from a digital format to an analog format for playback.

A BLUETOOTH module/transceiver 30 may transmit signals for pairing with vehicle transceiver 15. An example of a BLUETOOOTH module 30 is one manufactured by FREE2MOVE, part number F2M03MLA. An on-board antenna (not shown) may receive and transmit RF signals for transceiver 30 to transceiver 15 pairing/connection.

Figure 5:
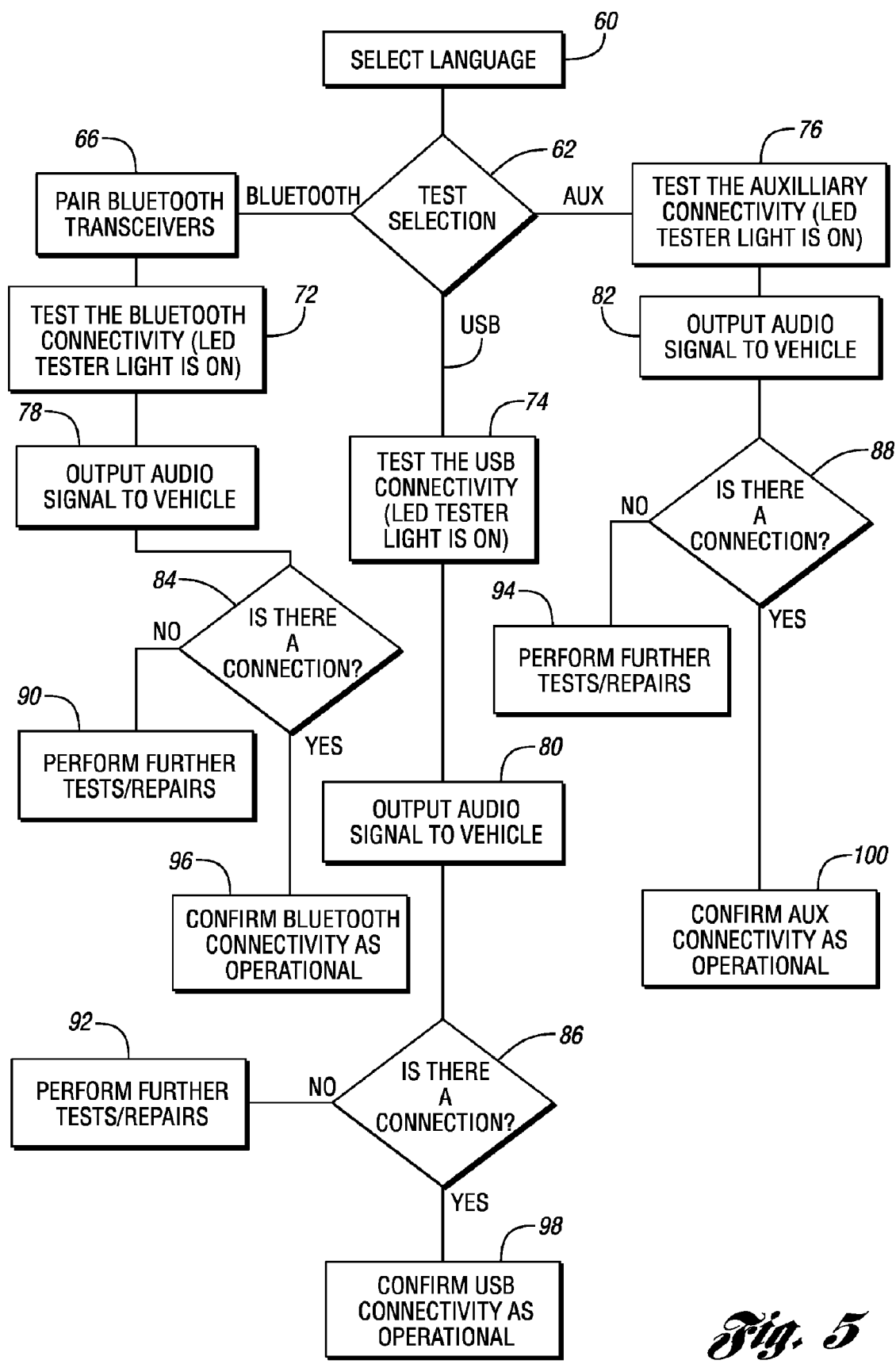
FIG. 5 is an exemplary flow diagram illustrating one embodiment of the operation of the multimedia testing tool.

While there maybe other environments in which the testing device will prove useful, it is contemplated that the testing device will generally be utilized when a vehicle technician is repairing or diagnosing problems with computing and communication system 1 illustrated in FIG. 1. FIG. 5 discloses a flow diagram illustrating example steps for operating the testing device according to one embodiment. Those of skill in the art will appreciate that the processes illustrated in FIG. 5 may be supplemented or modified to best-fit a particular implementation of the present invention. The present invention, and the operation of the present invention, is not limited to the particular process illustrated in FIG. 5.

To operate the testing device according to this example, a service technician may power the device by plugging in the USB cable 18 to a powered USB interface port within vehicle 31. Alternatively, a separate USB or auxiliary power cable (not shown) may be attached to the testing device for power. A service technician may also connect the auxiliary audio jack 20 to an auxiliary interface at vehicle 31. A service technician is not required to test the communication channels in a specific order. For example, a user may test the BLUETOOTH connection first followed by the auxiliary and USB connections. During the next testing opportunity, the user may first test the USB connection followed by the BLUETOOTH and auxiliary. Accordingly, any communication channel testing order can be implemented. As mentioned above, other communication channels may be tested such as WiMax, WiFi, ZigBee, and wireless USB. The audio portion of an MP4 can also be tested.

Typically, the first step in the testing process is to select the language for the testing, as indicated at block 60. This is because all tests are typically performed by the same technician in the same language, regardless of the communicating channel being tested. In one embodiment, English, French or Spanish may be selected as the output language. In the USB mode, all languages may be outputted sequentially.

To change languages according to one embodiment, the test selector button 12 may be pressed and held for a predetermined amount of time (e.g., 3 seconds) until LEDs 6a-6c blink. While holding test selector button 12 pressed, the pair button 16 may be pressed to select the desired language, until the LED 6a, 6b, or 6c for the desired language has been illuminated.

Next, the technician may select the particular communication channel to test, as indicated at block 62. In this example, there are three communication channel options: BLUETOOTH, USB and auxiliary. Other communications channels may be tested as described earlier. Communication channel selection may be executed by depressing selector button 12 illustrated in FIG. 2 to sequentially select the desired communication channel for testing. The presently-selected communication channel may be visually identified by LEDs 14 associated with each channel on the face of tool 11, as illustrated in FIG. 2. Alternatively, a separate test selection button may be associated with each communication channel.

The vehicle 31 may include an input selector 51 which may be operated to select the desired input to CPU 3. In this example, the BLUETOOTH input would be selected, channeling signals from BLUETOOTH transceiver 15 to CPU 3 to initiate a pairing with test tool 11.

Figure 6A:
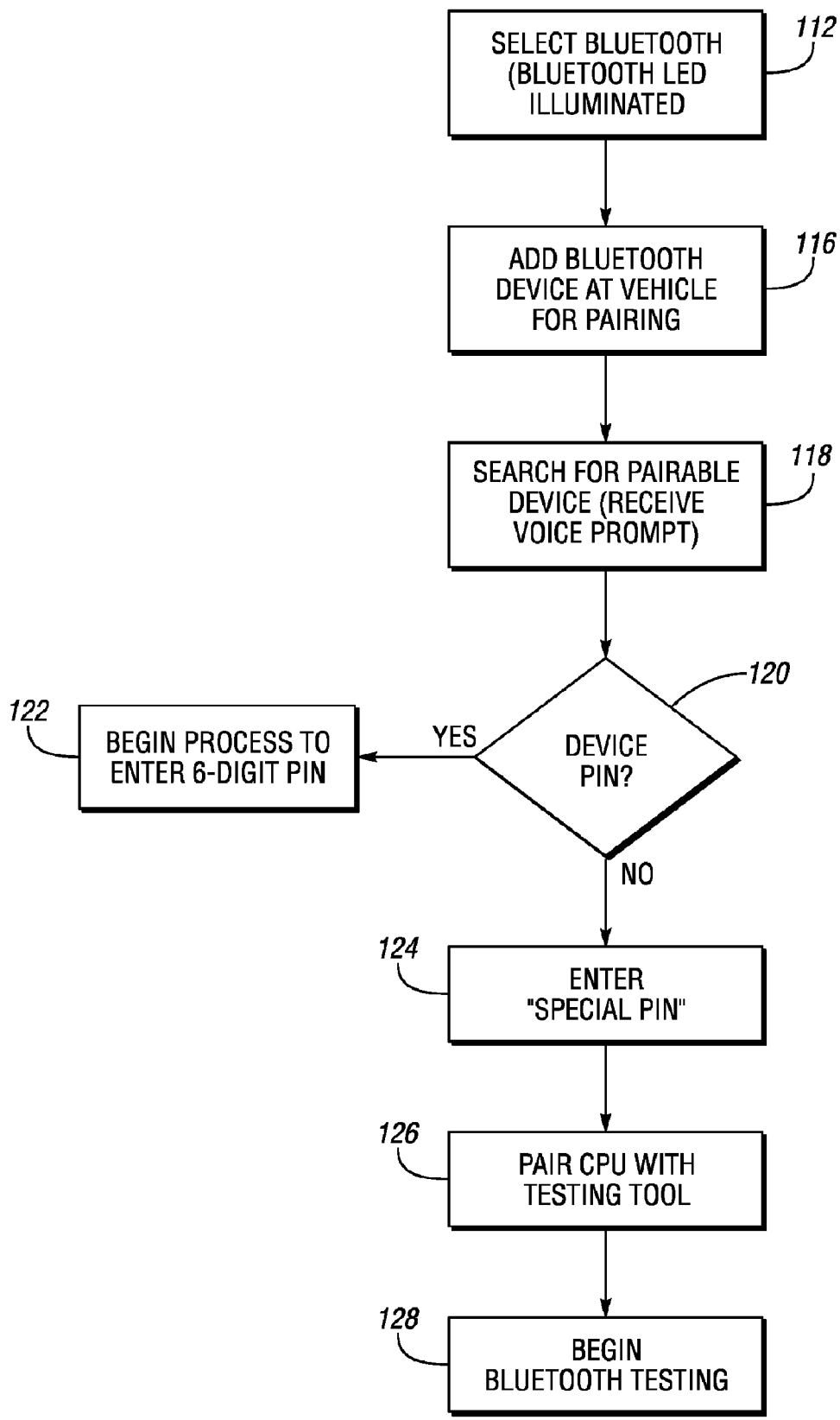
FIG. 6A is an exemplary flow diagram illustrating one embodiment of a BLUETOOTH pairing process of the multimedia testing tool to the vehicle computer.
Figure 6B:
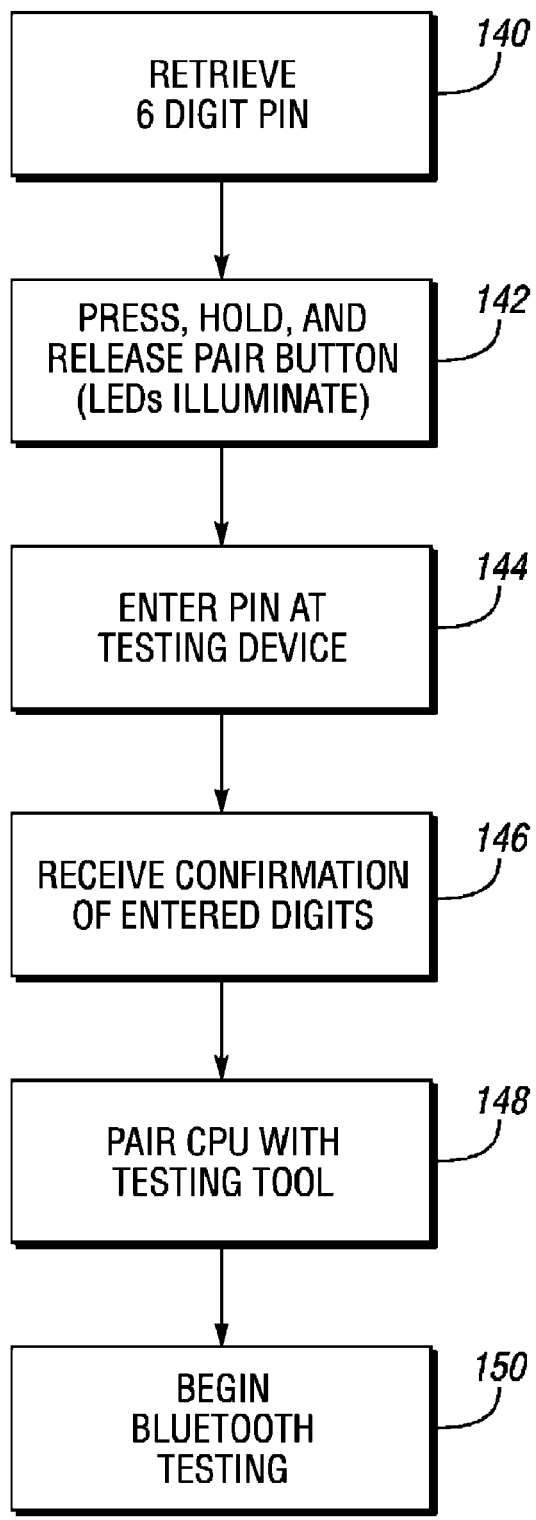
FIG. 6B is an exemplary flow diagram illustrating another embodiment of a BLUETOOTH pairing process of the multimedia testing to the vehicle computer.

To test the BLUETOOTH communication channel, the technician must first pair the BLUETOOTH transceiver 30 within the tool 11 with the BLUETOOTH transceiver 15 in the vehicle 31, as indicated at block 66. Pairing mode is entered at tool 11 by depressing the BLUETOOTH pair button 16 illustrated in FIG. 2. The vehicle 31 may also include a BLUETOOTH pairing button 53 which may be also pressed to complete the pairing operation. FIGS. 6A and 6B show two block diagrams representing exemplary embodiments of the pairing operation.

As shown in FIG. 6A, upon selecting BLUETOOTH testing at test selector 12 as reflected in block 112, the BLUETOOTH LED 14b will illuminate. A menu button (not shown) on the CCS 1 may direct the user to a system settings function for pairing with a BLUETOOTH device as represented in block 116. A voice prompt outputted from speakers 13 may indicate that a search is being made for pairable devices as represented in block 118. Once paired, the user may enter a "special PIN" (e.g., "0000") as represented in block 124. As will be described below, the CCS 1 may be defaulted to requiring a multiple digit (e.g., six-digit) PIN for pairing as indicated in block 120. Accordingly, a user may be required to select an option a the CCS 1 for entering the "special PIN" as represented in block 124.

The user may then select the pair button 16 on the testing device 11. Pairing of the devices as represented in block 126 can be identified by the LED 14b blinking several times or for several seconds. Testing of the BLUETOOTH communication channel may then commence as indicated in block 128.

FIG. 6B shows an example of the default pairing scenario. The user may be required to retrieve a multiple digit (e.g., six-digit) PIN stored in the CCS 1 as represented in block 140. The user may enter the six-digit PIN to the testing device 11. In one example for doing so, the pair button 16 may be held for a predetermined time (e.g., 3 seconds) until LEDs 14a-14c illuminate as represented in block 142. Upon releasing the pair button 16, the AUX LED 14a will remain illuminated. The PIN may be entered by pressing the pair button 16 a number of times equal to each digit of the multiple digit PIN as represented in block 144. For example, if the first digit is 3 and the second digit is 4, the pair button 16 is pressed 3 and 4 times respectively. The test selector button 12 is pressed after each entered digit. Once selected, LED 14b will blink indicating a pair key press has been entered. If the PIN has a "0", then only the test selector button 12 may be pressed.

Confirmation of each entered digit may be received from LED 14a-14c from left-to-right as indicated in block 146. For example, when entering the first digit, LED 14a may be illuminated. Once entered, LED 14b may be illuminated for the second digit. LEDs 14a-14c will re-illuminate from left-to-right for digits 4-6.

Upon entering all digits of a PIN, LED 14b may blink several times or for several seconds. Transceiver 15 will attempt pairing with testing device 11 as indicated in block 148. Testing of the BLUETOOTH communication channel may commence as indicated in block 150.

Once the BLUETOOTH transceivers are paired, and the test selector 12 is set to the BLUETOOTH communication channel, the channel communication test is initiated as indicated in block 72. CCS 1 may need to be configured for BLUETOOTH testing. For example, the user may be required to select "BT Audio" from the CCS 1 interface. A user may test all three communication channels by pairing the devices once. If the BLUETOOTH channel is retested, the user may be required to unplug and re-plug the USB power cable. The device 11 may not remain paired to the vehicle transceiver 15. Accordingly, the testing device 11 may also be removed from the paired device list of the BLUETOOTH transceiver 15 in communication with the CPU 3. Upon pairing the devices again, testing may re-commence.

During testing, a test message in the selected language is called from persistent memory 39 and outputted to BLUETOOTH transceiver 30 within the test tool 11 for wireless communication to the BLUETOOTH transceiver 15 within vehicle 31 for playback at speaker 13 within the passenger compartment as indicated at block 78. An English message may state, for example, "This is a test of the BLUETOOTH communication channel. If you can hear this message, the BLUETOOTH channel is working properly." If this message is heard by the technician, the BLUETOOTH communication channel is determined to be operational, as indicated at block 96. If the message is not heard, there may be a problem with the BLUETOOTH communication channel and further diagnosis and testing may be required by the technician, as indicated at block 90.

To test the USB communication channel, a user may insert USB cable 18 into the corresponding USB interface 23 within the vehicle 31. The user may press the test selector button 12 in order to initiate the testing of the USB communication channel as indicated in block 62. LED 14c will illuminate. The technician may also operate input selector 51 at the vehicle 31 to select the USB input to CPU 3. In one embodiment, the USB selection at the test tool 11 activates USB relay 38 and permits the playback of audio test files located on flash drive or memory stick 32 illustrated in FIG. 3. In another embodiment, no USB controller relay is used and access to the test messages is provided immediately upon connecting USB cable 18 to USB interface 23. In a third embodiment, the test messages are stored in persistent memory 39 at microcontroller 42. The particular test message selected for playback is separately addressed in persistent memory 39 for playback using USB controller 43.

To complete connectivity with CPU 3, the service technician may have to select the USB interface 23 for input at the vehicle 31. Upon selecting the USB output at tool 11, and the USB input at vehicle 31, the USB communication channel is tested as indicated at block 74. In one embodiment, one or more test messages in one or more languages originates from memory 32 and is played back through digital-to-analog converter 9, amplifier 11 and speaker 13 located within the vehicle, as indicated in block 80. An English message may state, for example, "This is a test of the USB communication channel. If you can hear this message, the USB channel is working properly." If this message is heard by the technician, the USB communication channel is determined to be operational, as indicated at block 98. If the message is not heard, there may be a problem with the USB communication channel and further diagnosis and testing may be required by the technician, as indicated at block 92.

To test the auxiliary communication channel, a service technician may connect the auxiliary audio cable 20 to auxiliary input port 25 at the vehicle 31. The user may then press the test selector button 12 in order to initiate the testing of the auxiliary communication channel at the tool 11. The user may also operate an input selector button 53 located in the vehicle 31 to select the auxiliary channel input to the CPU for playback at speakers 13. At this point, testing of the auxiliary communication channel may be tested, as illustrated in block 76. Microprocessor 42 may retrieve an audio test file from persistent memory 39 in the selected language and output that signal through auxiliary output 20 for transmission to auxiliary input 25, processing at CPU 3, and playback through speakers 13, as illustrated in block 82. An English message may state, for example, "This is a test of the auxiliary communication channel. If you can hear this message, the auxiliary channel is working properly."

If this message is heard by the technician, the auxiliary communication channel is determined to be operational, as indicated at block 100. If the message is not heard, there may be a problem with the auxiliary communication channel and further diagnosis and testing may be required by the technician, as indicated at block 94.

In another embodiment of the present invention, the testing device may be configured to broadcast testing signals to all communication channels in substantially simultaneous or overlapping intervals. Alternatively, the testing device may scan through all communication channels and signal to the user automatically when to switch the protocol being tested.

The present embodiments can also be used to test multimedia communication systems or multimedia entertainment systems. Embodiments of the devices to be tested are standard entertainment or communication systems having a plurality of different communication channel inputs or a communication or entertainment system embedded within a larger apparatus assembly or computing system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An apparatus for remotely testing a plurality of communication channel inputs to an automobile computer, the apparatus comprising:

microprocessor electrically connected to a persistent memory having stored therein communication channel test messages corresponding to each of two or more communication channel inputs to an automobile computer, at least one of which is a wireless communication channel, wherein the microprocessor is configured to output a test message over a selected communication channel to the automobile computer;

a wireless transceiver in communication with the microprocessor for wirelessly communicating at least one of the test messages to a wireless communication input to the automobile computer; and one or more switches connected to the microprocessor which, upon operation, cause the microprocessor to (1) pair the wireless transceiver with the wireless communication input to the automobile computer, (2) select one of the two or more communication channel inputs and corresponding test messages for testing, and (3) output the corresponding test message over the selected communication channel input.

2. The apparatus of claim 1 wherein the wireless communication channel is a BLUETOOTH communication channel.

3. The apparatus of claim 1 additionally comprising one or more output indicators to identify which of the two or more communication channels has been selected for testing.

4. The apparatus of claim 3 wherein the output indicator is a light emitting diode.

5. The apparatus of claim 1 wherein the communication channel test messages are stored in two or more different languages, and wherein operation of the one or more switches additionally cause the microprocessor to select the language of the test message for output over the selected communication channel.

6. The apparatus of claim 1 wherein the two or more communication channels includes a universal serial bus.

7. The apparatus of claim 6 wherein a voltage differential on the universal serial bus provides power to the microprocessor.

8. The apparatus of claim 1 wherein the persistent memory is flash memory.

9. The apparatus of claim 1 additionally comprising a digital-to-analog converter for converting digitally-encoded test messages into analog audio signals.

10. A method for remotely testing the operability of two or more communication channel inputs to a vehicle computer, the method comprising:
at a test tool remote from the vehicle computer, (1) receiving input selecting one of two or more communication channel inputs to the vehicle computer, at least one of which is a wireless communication channel, (2) pairing a wireless transceiver in the test tool with a wireless transceiver electrically connected to the vehicle computer, and (3) outputting over the selected communication channel a test message unique to that communication channel.

11. The method of claim 10 additionally comprising, at the vehicle computer, (1) receiving input selecting one of one of two or more communication channel inputs to the vehicle computer, (2) receiving input for pairing a wireless transceiver in communication with the vehicle computer with a wireless transceiver in the test tool, and (3) if the test message is received at the vehicle computer over the selected communication channel, outputting the message for playback over the vehicle audio system.

12. The method of claim 10 additionally comprising illuminating at the test tool an indicator identifying which communication channel has been selected for testing.

13. The method of claim 10 additionally comprising selecting a test message language from two or more languages at the test tool, and outputting the test message over the selected communication channel in the selected language.

14. The method of claim 13 additionally comprising illuminating at the test tool an indicator identifying which test message language has been selected.

15. The method of claim 10 additionally comprising receiving at the test tool input defining a multiple digit PIN number for pairing the wireless transceiver with the wireless transceiver electrically connected to the vehicle computer.

16. The method of claim 10 wherein the wireless communication channel is a BLUETOOTH communication channel.

17. The method of claim 10 additionally comprising establishing a universal serial bus communication connection between the test tool and the vehicle computer.

18. The method of claim 10 additionally comprising establishing an analog auxiliary communication connection between the test tool and an analog input to a vehicle entertainment system.

19. The method of claim 10 additionally comprising establishing a power connection between a power supply in the vehicle and the test tool.

20. The method of claim 10 additionally comprising illuminating an indicator at the test tool to indicate the state of a pairing mode for the wireless transceiver.

* * * * *